United States Patent
Nagasaki et al.

(10) Patent No.: US 8,399,417 B2
(45) Date of Patent: Mar. 19, 2013

(54) FOOD

(75) Inventors: Hiroaki Nagasaki, Kawasaki (JP);
Naohiro Miyamura, Kawasaki (JP);
Yuzuru Eto, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 0 days.

(21) Appl. No.: 12/613,590

(22) Filed: Nov. 6, 2009

(65) Prior Publication Data
US 2010/0120698 A1   May 13, 2010

Related U.S. Application Data

(63) Continuation of application No. PCT/JP2008/058325, filed on May 1, 2008.

(30) Foreign Application Priority Data

May 8, 2007  (JP) ................. 2007-123769

(51) Int. Cl.
*A61K 38/07* (2006.01)
*A61K 38/06* (2006.01)

(52) U.S. Cl. .................... 514/21.9; 530/331

(58) Field of Classification Search .............. None
See application file for complete search history.

(56) References Cited

U.S. PATENT DOCUMENTS

| | | | |
|---|---|---|---|
| 3,331,828 A | 7/1967 | Inamine et al. | |
| 3,924,015 A | 12/1975 | Winter et al. | |
| 4,741,914 A | 5/1988 | Kimizuka et al. | |
| 4,758,551 A | 7/1988 | Meister et al. | |
| 4,927,808 A | 5/1990 | Kitahara et al. | |
| 5,089,476 A | 2/1992 | Agouridas et al. | |
| 5,409,904 A | 4/1995 | Hecht et al. | |
| 5,679,397 A | 10/1997 | Kuroda et al. | |
| 6,573,299 B1 | 6/2003 | Petrus | |
| 6,716,461 B2 * | 4/2004 | Miwa et al. | 426/34 |
| 6,733,797 B1 | 5/2004 | Summers | |
| 7,118,775 B2 | 10/2006 | Kohmura et al. | |
| 2002/0061358 A1 | 5/2002 | Miwa et al. | |
| 2002/0176900 A1 | 11/2002 | Yegorova | |
| 2003/0211172 A1 | 11/2003 | Jones et al. | |
| 2004/0052920 A1 | 3/2004 | Koike et al. | |
| 2004/0116345 A1 | 6/2004 | Besman et al. | |
| 2004/0265471 A1 | 12/2004 | Kohmura et al. | |
| 2005/0244512 A1 | 11/2005 | Holekamp et al. | |
| 2006/0083847 A1 | 4/2006 | Iwasaki et al. | |
| 2006/0189603 A1* | 8/2006 | Garvey et al. | 514/223.2 |
| 2006/0287390 A1 | 12/2006 | Sagawa et al. | |
| 2009/0130282 A1 | 5/2009 | Hofmann et al. | |
| 2009/0239310 A1* | 9/2009 | Ohsu et al. | 436/501 |
| 2009/0239808 A1 | 9/2009 | Ohsu et al. | |
| 2009/0246835 A1 | 10/2009 | Iwatani et al. | |
| 2010/0120698 A1 | 5/2010 | Nagasaki et al. | |
| 2011/0046046 A1 | 2/2011 | Hara et al. | |
| 2011/0070270 A1 | 3/2011 | Kodera et al. | |
| 2011/0071075 A1 | 3/2011 | Takeuchi et al. | |

FOREIGN PATENT DOCUMENTS

| | | |
|---|---|---|
| EP | 0449354 | 10/1991 |
| EP | 0672354 | 9/1995 |
| EP | 1197152 | 4/2002 |
| EP | 1 554 939 | 7/2005 |
| JP | 60-009465 | 1/1985 |
| JP | 60-232071 | 11/1985 |
| JP | 60-237963 | 11/1985 |
| JP | 7-188282 | 7/1995 |
| JP | 08-289760 | 11/1996 |
| JP | 10-276709 | 10/1998 |
| JP | 2001-321117 | 11/2001 |
| JP | 2002-138296 | 5/2002 |
| JP | 2002-369653 | 12/2002 |
| JP | 2004-215563 | 8/2004 |
| JP | 2004-167160 | 9/2004 |
| JP | 2005-046109 | 2/2005 |
| JP | 2006-158232 | 6/2006 |
| JP | 2006-180792 | 7/2006 |
| JP | 2008-054507 | 3/2008 |
| WO | WO92/07267 | 4/1992 |
| WO | WO94/22438 | 10/1994 |
| WO | WO01/51629 | 7/2001 |
| WO | WO02/49653 | 6/2002 |
| WO | WO03/029417 | 4/2003 |
| WO | WO03/049687 | 6/2003 |
| WO | WO 2007/042288 | 4/2007 |
| WO | WO 2007/055388 | 5/2007 |
| WO | WO 2007/055393 | 5/2007 |

OTHER PUBLICATIONS

Abdulrahim Jayyab, Nutritional Pharmacology of Glutathione, www.naturalhealthweb.com/articles/Jayyab.7.html, Self Improvement Online, Inc. 2003 p. 1-2.*
Ueda et. al. Glutathione in raw and Cooked Foodstuffs Biosci., Biotech. Biochem, 61 (12) 1997, p. 1978 Table I.*
Jayyab, Nutritional Pharmacology of Glutathione, www.naturalhealthweb.com/articles/Jayyab.7.html, Self Improvement Online, Inc. 2003 p. 1-2.*
Leslie et. al. Structural Requirements for Functional Interaction of Glutathione Tripeptide Analogs with the Human Multidrug Resistance Protein 1 (MRP 1) The Journal of Pharmacology and Experimental Therapeutics, vol. 304, No. 2 p. 645.*
Ueda et. al. Flavor Characteristics of Glutathione in raw and Cooked Foodstuffs Biosci., Biotech. Biochem, 61 (12) 1997, p. 1978 Table I.*
Leslie et. al. Structural Requirements for Functional Interaction of Glutathione Tripeptide Analogs with the Human Multidrug Resistance Protein 1 (MRP1) The Journal of Pharmacology and Experimental Therapeutics, vol. 304, No. 2 p. 645.*

(Continued)

*Primary Examiner* — Cecilia J Tsang
*Assistant Examiner* — Jeanette Lieb
(74) *Attorney, Agent, or Firm* — Shelly Guest Cermak; Cermak Nakajima LLP

(57) ABSTRACT

A low-fat food containing an amino acid or a peptide which is able to activate a calcium receptor, examples of which include γ-Glu-X-Gly, γ-Glu-Val-Y, γ-Glu-Ala, γ-Glu-Gly, γ-Glu-Cys, γ-Glu-Met, γ-Glu-Thr, γ-Glu-Val, γ-Glu-Orn, Asp-Gly, Cys-Gly, Cys-Met, Glu-Cys, Gly-Cys, Leu-Asp, D-Cys, γ-Glu-Met(O), γ-Glu-γ-Glu-Val, γ-Glu-Val-NH$_2$, γ-Glu-Val-ol, γ-Glu-Ser, γ-Glu-Tau, γ-Glu-Cys(S-Me)(O), γ-Glu-Leu, γ-Glu-Ile, γ-Glu-t-Leu, γ-Glu-Cys(S-Me), etc, wherein X and Y are an amino acid or an amino acid derivative.

7 Claims, 4 Drawing Sheets

OTHER PUBLICATIONS

Freidl et. al. Stimulation of nitric oxide synthesis by the aqueous extract of *Panax ginseng* root in RAW 264.7 cells.British Journal of Pharmacology, Dec. 2001 134(8).*

Randle et. al. Quantifying Onion Flavor Compounds Responding to Sulfur Fertility-Sulfur Increases Levels of Alk(en)yl Cysteine Sulfoxides and Biosynthetic Intermediates, J. Amer. Soc. Hort. Sci. 120(6):1075-1081. 1995.*

Ueda, Y., et al., "Characteristic Flavor Constiments in Water Extract of Garlic," Agric. Biol. Chem. 1990;54(1):163-169.

Notice of Reason for Rejection in Japanese Patent App. No. 2010-034162 (Jan. 25, 2011) with English Translation thereof.

Office Action issued in U.S. Appl. No. 12/117,027 (Jan. 4, 2011).

Cobb, M. H., et al., "Structural and Conformational Properties of Peptides Interacting with the Gluathione Receptor of Hydra," Mol. Pharmacol. 1982;21:629-636.

De Craecker, S. et al., "Characterization of the peptide substrate specificity of glutathionylspermidine synthetase from *Crithidia fasciculate*," Mol. Biochem. Parasitology 1997;84:25-32.

Schukina, L. A., et al., "Synthesis and biological activity of glycolyl 3-glutathione," Inst. Khim. Prirod. Soed., Moscow, USSR, Zhurnal Obshchei Khimii (1967), 37(9), 1980-1987.

Ueda, Y., et al., "Composition of Sulfur-Containing Components in Onion and Their Flavor Chracters," Biosci. Biotech. Biochem. 1994;58(1):108-110.

Valyakina, T. I., et al., "Biological activity of peptide and depsipeptide analogs of ophthalmic [Y-glutamyl-α-aminobutyrylglycine] and norophthalmic [Y-glutamyl-alanylglycine] acids in glyoxalase I and formaldehyde; NAD-oxidoreductase enzyme systems," Biokhimiya 1972;37(4):757-761, with English abstract.

International Search Report and Written Opinion of the International Searching Authority for PCT Patent App. No. PCT/JP2006/322694 (Mar. 16, 2007).

International Preliminary Report on Patentability for PCT Patent App. No. PCT/JP2006/322694 (May 22, 2008).

Final Report, "The quantification of natural occuring KF001 in food," pp. 1-8, Ajinomoto Co., Inc., Tokyo, Japan.

Morrot, G., et al., "The Color of Odors," Brain and Language 2001;79:309-320.

Anonymous: "Calcium sensing receptor," Wikipedia (English language), Aug. 27, 2010, XP002598415, Retrieved from the Internet: URL: http://en.wikipedia.org/wiki/Calcium-sensing_receptor.

Bevilacqua, M., et al., "Increased Gastrin and Calcitonin Secretion after Oral Calcium or Peptones Administration in Patents with Hypercalciuria: A Clue to an Alteration in Calcium-Sensing Receptor Activity," J. Clin. Endocrinol. Metab. 2005;90(3):1489-1494.

Canaff, L., et al., "Extracellular Calcium-sensing Receptor is Expressed in Rat Hepatocytes," J. Biol. Chem. 2001;276(6):4070-4079.

Chattopadhyay, N., et al., "Expression of Extracellular Calcium-Sensing Receptor by Human Lens Epithelial Cells," Biochem. Biophys. Res. Comm. 1997;233:801-805.

Chattopadhyay,, N., et al., "Mitogenic Action of Calcium-Sensing Receptor on Rat Calvarial Osteoblasts," Endocrinol. 2004;145(7):3451-3462.

Cheng, L., et al., "Identification and Localization of the Extracellular Calcium-Sensing Receptor in Human Breast," J. Clin. Endocrinol. Metab. 1998;83(2):703-707.

Cheng, S.X., et al., "Expression of calcium-sensing receptor in rat colonic epithelium: evidence for modulation of fluid secretion," Am. J. Physiol. Gastrointest. Liver Physiol. 2002;283:240-250.

Cifuentes, M., et al., "Calcium-Sensing Receptor Expression in Human Adipocytes," Endocrinology 2005;146(5):2176-2179.

Conigrave, A. D., et al., "L-Amino acid sensing by the calcium-sensing receptor: a general mechanism for coupling protein and calcium metabolism?" Eur. J. Clin. Nutr. 2002;56:1072-1080.

Conigrave, A. D., et al., "L-Amino acid sensing by the extracellular $Ca^{2+}$-sensing receptor," PNAS 2000;97(9):4814-4819.

Database CA [online], Chemical Abstracts Services, Columbus, OH, US; May 12, 1984, Valyakina, T. I., et al.; Biological activity of peptide and depsipeptide analogs of ophthalmic [.gamma.-glutamyl-.alpha.-aminobutyrylglycine] and norophthalmic [.gamma.-glutamyl-alanylglycine] acids in glyoxalase I and formaldehyde: NAD-oxidoreductase enzyme systems; XP-002438771, 1 pg.

House, M. G., et al., "Expression of an Extracellular Calcium-Sensing Receptor in Human and Mouse Bone Marrow Cells," J. Bone Min. Res. 1997;12(12):1959-1970.

Jensen, B., et al., "High extracellular calcium attenuates adipogenesis in 3T3-L1 preadipocytes," Exp. Cell Res. 2004;301:280-292.

Li, X., et al., "Net efflux of cysteine, glutathione and related metabolites from rat hippocampal slices during oxygen/glucose deprivation: dependence on γ-glutamyl transpeptidase," Brain Res. 1999;815:81-88.

Li, X., et al., "γ-Glutamyl Peptides and Related Amino Acids in Rat Hippocampus in vitro: Effect of Depolarization and γ-Glutamyl Transpeptidase Inhibition," Neurochem. Int. 1996;29(2):121-128.

Malaisse, W. J., et al., "Possible Participation of an Islet B-Cell Calcium-Sensing Receptor in Insulin Release," Endocrine 1999;11(3):293-300.

Nemeth, E. F., et al., "Calcimimetics with potent and selective activity on the parathyroid calcium receptor," Proc. Natl. Acad. Sci. USA 1998;95:4040-4045.

Olszaki, I. T., et al., "Extracellular calcium elicits a chemokinetic response from monocytes in vitro and in vivo," J. Clin. Investigation 2000;105(9):1299-1299-1305.

Tu, Chia-Ling, et al., "The role of the calcium-sensing receptor in epidermal differentiation," Cell Calcium 2004;35:265-273.

Yamauchi, M., et al., "Involvement of calium-sensing receptor in osteoblastic differentiation of mouse MC3T3-E1 cells," Am. J. Physiol. Endocrinol. Metab. 2004;288:E608-E616.

International Search Report and Written Opinion of the International Searching Authority for PCT/JP2006/322684 (Jul. 13, 2007).

International Preliminary Report on Patentability for PCT Patent App. No. PCT/JP2006/322684 (May 22, 2008).

European Search Report for EP Patent App. No. 10002380.3 (Sep. 17, 2010).

Partial European Search Report for EP Patent App. No. 10012901.4 (Feb. 17, 2011).

Notice of Reason for Rejection for JP Patent App. No. 2010-034162 (Jan. 25, 2011).

Danner, J., et al., "Interaction of Glutathione Analogues with *Hydra attenuata* γ-Glutamyltransferase," Biochem. J. 1978;175:547-553.

Goodman and Gilman's Manual of Pharmacology and Therapeutics, pp. 528-543 and 1059-1074 (Eds: Brunton & Parker; McGraw-Hill, 2008).

Suzuki, H., et al., "Improvement of the Flavor of Amino Acids and Peptides Using Bacterial γ-Glutamyltranspeptidase," Recents Highlight in Flavor Chemistry & Biology 2007, pp. 227-232, Eds. Hofmann, T., et al., Deutsche Forschungsanstalt für Lebensmittelchemie, Garching, Germany.

Breitwieser, G. E., et al., "Calcium sensing receptors as integrators of multiple metabolic signals," Cell Calcium 2004;35:209-216.

Brown, E. M., et al., "Cloning and characterization of an extracellular $Ca^{2+}$-sensing receptor from bovine parathyroid," Nature 1993;366:575-580.

McLarnon, S. J., et al., "Physiological and pharmacological agonists of the extracellular $Ca^{2+}$-sensing receptor," Eur. J. Pharmacol. 2002;447:271-278.

Squires, P. E., "Non-Ca2+-homeostatic functions of the extracellular $Ca^{2+}$-sensing receptor (CaR) in endocrine tissues," J. Endocrinol. 2000;165:173-177.

Wang, M., et al., "Activation of Family C G-protein-coupled Receptors by the Tripeptide Glutathione," J. Biol. Chem. 2006;281(13):8864-8870.

U.S. Appl. No. 12/121,969, filed May 16, 2008, Eto et al.
U.S. Appl. No. 61/250,998, filed Oct. 13, 2009, Hara et al.
U.S. Appl. No. 12/613,615, filed Nov. 6, 2009, Nagasaki et al.
U.S. Appl. No. 12/613,727, filed Nov. 6, 2009, Yoneda et al.

Dunkel, A., et al., "Molecular and Sensory Characterization of γ-Glutamyl Peptides as Key Contributors to the Kokumi Taste of Edible Beans (*Phaseolus vulgaris* L.)," J. Agric. Food Chem. 2007;55:6712-6719.

Ueda, Y., et al., "Flavor Characteristics of Glutathione in Raw and Cooked Foodstuffs," Biosci. Biotech. Biochem. 1997;61(12):1977-1980.

International Search Report for PCT Patent App. No. PCT/JP2008/058325 (May 27, 2008).

Supplementary European Search Report for EP Patent App. No. 08752255.3 (Oct. 27, 2010).

International Preliminary Report on Patentability for PCT Patent App. No. PCT/JP2008/058325 (Dec. 3, 2009).

Kirimura, J., et al., "The Contribution of Peptides and Amino Acids to the Taste of Foodstuffs," J. Agric. Food Chem. 1969;17(4):689-695.

Food Processing Technologies (Shokuhin Kako Gijutsu), 2005, vol. 25, No. 2, pp. 52-58 with partial English translation (p. 52, sections 1 and 2; p. 57, right col. to p. 58, right col., figure 8).

Notice of Reason for Rejection issued on Nov. 1, 2011 from Japan Patent Office in the corresponding Japanese Patent App. No. 2011-066637 with an English translation.

* cited by examiner

FOOD

This application is a continuation under 35 U.S.C. §120 of PCT Patent Application No. PCT/JP2008/058325, filed May 1, 2008, which claims priority under 35 U.S.C. §119 to Japanese Patent Application No. 2007-123769, filed on May 8, 2007, which are incorporated in their entireties by reference. The Sequence Listing in electronic format filed herewith is also hereby incorporated by reference in its entirety (File Name: US-415_Seq_List; File Size: 1 KB; Date Created: Nov. 6, 2009).

BACKGROUND OF THE INVENTION

1. Field of the Invention

The present invention relates to a low-fat food and a taste-improving agent that can be used to impart fat-like richness and smoothness to the taste of a low-fat food.

2. Brief Description of the Related Art

In recent years, attention has been focused on problems associated with lifestyle-related diseases due to excess intake of calories and fat. As a result, in the food industry, there is increasing interest in low-calorie, low-fat, non-fat foods, or the like because of diversified consumer needs and growing health consciousness. On the basis of those demands, products have been developed in various fields. However, because fat contributes greatly to food palatability, the general taste of low-fat or non-fat foods is plain or bland, is weak in kokumi, and also is weak in fat-derived richness and smoothness. Therefore, low-fat or non-fat foods are not always appealing to the consumer. In the present circumstances, consumer preferences are not sufficiently satisfied.

Furthermore, in the field of dairy products, in particular, although there are many product groups in which milk fat is replaced with vegetable oil or the like, the difference in the taste is clear in many cases.

Thus far, various efforts have been implemented in order to solve the above-mentioned problems. In relation to dairy products, the following are examples of attempts to improve the taste of low-fat products: incorporating a water-soluble dietary fiber (JP 2006-158232 A); using a chemically-modified starch, or the like, in combination with a water-soluble dietary fiber (JP 2004-215563 A and JP 2004-267160 A); and using agar (JP 2006-180792 A). Furthermore, various technologies have been tried to replace fat, such as an oil and fat composition focused on the constituent fatty acids (JP 2002-138296 A).

However, in all of the above cases, consumer demands have not been sufficiently satisfied. These products and methods fail in one or more aspects of palatability, such as fragrance, flavor, taste, or texture, and in terms of too many production steps and prices as well.

The calcium receptor (also called Calcium Sensing Receptor (CaSR)) has 1,078 amino acids, and is classified into class C of the seven-transmembrane receptors (G protein-coupled receptor, or GPCR). Cloning of the gene for the calcium receptor was reported in 1993 (Nature, 1993, Vol. 366(6455), pp. 575-580), and the calcium receptor is known to cause various cell responses via elevation of the intracellular calcium levels, etc., when activated by calcium, etc. The nucleotide sequence of the human calcium receptor is registered with GenBank under Accession No. NM_000388, and is well conserved among animals.

The calcium receptor may act to promote or suppress biological functions. Therefore, at present, therapeutic agents that either activate or inhibit the calcium receptor are appropriately used in the treatment of diseases of the neurological, hepatic, cardiovascular, and digestive systems, and other diseases, depending on the pathological conditions. For example, the calcium receptor is able to detect increased blood calcium in the parathyroid, and then suppress the secretion of the parathyroid hormone (PTH) to correct the blood calcium level. Therefore, reduction of the blood calcium level is expected for a calcium receptor activator. It has been actually reported that when a calcium receptor activator is used to treat secondary hyperparathyroidism in a hemodialysis patient, it reduces the PTH level without elevating the calcium and phosphorus levels.

Since a functional analysis of the calcium receptor has been conducted mainly for calcium homeostasis, the applications, therefore, have so far mainly focused on bone metabolic diseases in which calcium regulation is involved. However, it has become clear that the calcium receptor is widely distributed in living bodies other than the parathyroid and kidney from the results of genetic expression analyses etc. (J. Endocrinol., 2000, Vol. 165(2), pp. 173-177 and Eur. J. Pharmacol., 2002, Vol. 447(2-3), pp. 271-278), and the possibility that the calcium receptor is involved in various biological functions and perhaps even the cause of some diseases has been proposed. For example, there has been speculation that the calcium receptor is involved in the functions of the liver, heart, lung, gastrointestinal tract, lymphocytes, and pancreas. It has also been confirmed that the calcium receptor is expressed in a wide range of tissues by analyzing RNAs extracted from rat tissue using RT-PCR. Therefore, the potential applications for activators and inhibitors of the calcium receptor are rapidly increasing.

Moreover, in addition to calcium, cations such as a gadolinium cation, basic peptides such as polyarginine, polyamines such as spermine, amino acids such as phenylalanine, and so forth have been reported as calcium receptor activators (Cell Calcium, 2004, Vol. 35(3), pp. 209-216). It has also been reported, that glutathione (γ-Glu-Cys-Gly), a low molecular weight peptide, is a CaSR activator, but there is no mention or suggestion that the CaSR is involved in any function of taste (J. Biol. Chem., 2006, Vol. 281(13), pp. 8864-8870.

Thus far, it has not been reported that an amino acid or a peptide having a particular structure is useful as a calcium receptor activator. In addition, it has not been previously reported that an amino acid or a peptide which is able to activate a calcium receptor can impart fat-like richness and smoothness to the taste of a low-fat food.

SUMMARY OF THE INVENTION

An aspect of the present invention is to provide a low-fat food to which fat-like richness and smoothness are imparted.

It has been found that both an amino acid and a peptide are each separately able to activate the calcium receptor. It has also been found that the amino acid and the peptide may improve taste, in particular, fat-like richness and smoothness, of a low-fat food. That is, the present invention provides the following:

It is an aspect of the present invention to provide a low-fat food comprising a compound which is able to activate a calcium receptor, wherein the concentration of said compound in said food is 1 ppb to 99.9% by weight.

It is an aspect of the present invention to provide the low-fat food as described above, wherein the compound is selected from the group consisting of γ-Glu-X-Gly, γ-Glu-Val-Y, γ-Glu-Ala, γ-Glu-Gly, γ-Glu-Cys, γ-Glu-Met, γ-Glu-Thr, γ-Glu-Val, γ-Glu-Orn, Asp-Gly, Cys-Gly, Cys-Met, Glu-Cys, Gly-Cys, Leu-Asp, D-Cys, γ-Glu-Met(O), γ-Glu-γ-Glu-Val, γ-Glu-Val-NH$_2$, γ-Glu-Val-ol, γ-Glu-Ser, γ-Glu-Tau, γ-Glu-Cys(S-Me)(O), γ-Glu-Leu, γ-Glu-Ile, γ-Glu-t-Leu, γ-Glu-Cys(S-Me), and combinations thereof; wherein X and Y are an amino acid or an amino acid derivative.

It is an aspect of the present invention to provide the low-fat food as described above, wherein the X is selected from the group consisting of Cys(SNO), Cys(S-allyl), Gly, Cys(S-Me), Abu, t-Leu, Cle, Aib, Pen, or Ser, and the Y is selected from the group consisting of Gly, Val, Glu, Lys, Phe, Ser, Pro, Arg, Asp, Met, Thr, His, Orn, Asn, Cys, Gln, GlyA, and LacA.

It is an aspect of the present invention to provide the low-fat food as described above, wherein the compound is selected from the group consisting of γ-Glu-Val-Gly and γ-Glu-Abu-Gly.

It is an aspect of the present invention to provide the low-fat food as described above, wherein the low-fat food is selected from the group consisting of a dairy product, a food comprising animal oil and fat, a food comprising vegetable oil and fat, and an emulsified food.

It is an aspect of the present invention to provide a taste-improving agent for imparting fat-like richness and smoothness to the taste of a low-fat food, which comprises a compound which is able to activate a calcium receptor.

DETAILED DESCRIPTION OF EXEMPLARY EMBODIMENTS

Figure 1:
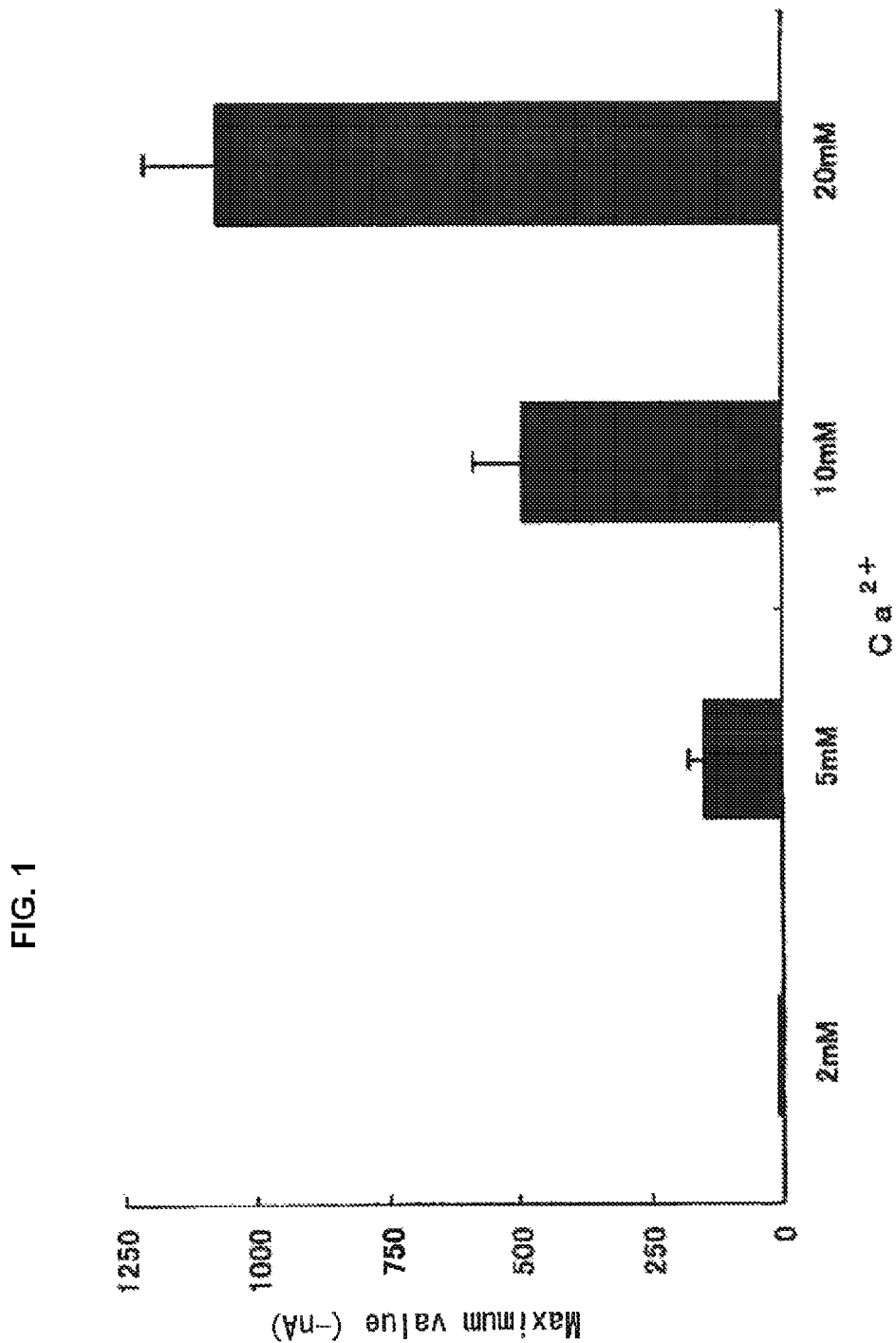
FIG. 1 shows a graph illustrating an action of calcium on a calcium receptor. The human calcium receptor cRNA was injected into Xenopus laevis oocytes by microinjection. The intracellular response current values were recorded when a calcium chloride solution was added at an arbitrary concentration. The maximum value of the intracellular current was defined as a response current value. It was confirmed that no response was observed in oocytes injected with distilled water by microinjection as a control.

Hereinafter, the present invention is described in detail.

A low-fat food containing a compound, such as a peptide or an amino acid, which is able to activate a calcium receptor is described. Furthermore, a taste-improving agent for use in a low-fat food is also described. When this agent is added to a low-fat food, a fat-like richness and smoothness is imparted to the taste of the low-fat food. This agent contains a compound that is able to activate a calcium receptor. The taste-improving agent has the effect of improving fat-like richness of a low-fat food when added to the low-fat food prior to eating the food. Furthermore, a low-fat food containing the taste-improving agent as described above is also described.

First, an amino acid or a peptide that is able to activate a calcium receptor is described.

The amino acid or the peptide described herein that is able to activate a calcium receptor can impart kokumi to a food. In general, the term "kokumi" can mean a taste that cannot be described by the five basic tastes. The five basic tastes are sweet, salty, sour, bitter, and umami. Therefore, kokumi can mean that the more marginal tastes outside of the basic tastes, such as thickness, growth (mouthfulness), continuity, and harmony, are enhanced, in addition to the basic tastes. The compound that is able to activate a calcium receptor can impart kokumi, in particular, fat-like richness and smoothness to a low-fat food.

The term "low-fat food" can mean a food in which the original fat content is reduced. The term "fat" can have the same meaning as the term "oil and fat", and can mean both a narrowly-defined fat, which is a solid, and fatty oil, which is a liquid at normal temperature. Further, the term fat can include both animal fat and vegetable fat.

The amino acid or the peptide can impart fat-like richness and smoothness to a fat-containing food to a greater or smaller extent depending on the fat content. Thus, the extent of the "reduction" of the fat content is not limited. However, a food containing less fat, or in which the fat-content has been reduced as compared to a similar food in which the fat content has not been reduced, can benefit from the presence of the amino acid or peptide which is able to activate a calcium receptor to a greater extent.

To impart "fat-like richness and smoothness" can mean providing fat-like richness and smoothness to a food having nearly-imperceptible fat-like richness and smoothness, and can also mean enhancing the fat-like richness and smoothness which are already present in a food. The phrase "improvement of fat-like richness and smoothness" can have the same meanings.

Specific examples of the low-fat food include a dairy product such as cow milk, yogurt, butter, and cream; a food containing animal oil and fat and/or vegetable oil and fat, such as margarine, milk for coffee, sauce, and roux; and also can include an emulsified food such as dressing and mayonnaise.

The term "fat-like richness" can mean richness felt in the mouth mainly between the middle taste and the aftertaste, which is perceived when a fat-containing food is eaten. Furthermore, the term "smoothness" can mean mildness and roundness, which are perceived when a fat-containing food is eaten. In general, when those two are combined, a sticky taste and a lasting, pronounced, and fatty taste are perceived in the mouth or on and around the tongue. The sense of taste varies with time once the food is placed in the mouth, and the various stages of taste can be sequentially referred to, from immediately after placing the food in the mouth, the initial taste, then the middle taste, and finally the aftertaste. These stages are relative, and typically, initial taste, middle taste, and aftertaste occur 0 to 2 seconds, 3 to 4 seconds, and 5 seconds or later after placing the food in the mouth, respectively. Hereinafter, except when fat-like richness and smoothness are described in combination, these are simply described as "fat-like richness" collectively in some cases.

The term "calcium receptor" can mean a receptor that is called the Calcium Sensing Receptor (CaSR) and belongs to class C of the seven-transmembrane receptors. The term "calcium receptor activator" can mean a substance that binds to and, as a result, activates the calcium receptor. The phrase "to activate a calcium receptor" or "activates the calcium receptor" can mean that a ligand that binds to the calcium receptor and activates a guanine nucleotide binding protein, and thereby transmits a signal. In addition, the term "calcium receptor activity" can mean that the calcium receptor transmits a signal.

Each amino acid or the amino acids that make up each peptide are L-amino acids unless otherwise stated.

<1> Compound Having Calcium Receptor-Activating Effect

The compound that activates a calcium receptor can be an amino acid, a peptide, derivatives thereof, or various low molecular weight compounds as long as the compound is able to improve the fat-like richness of a low-fat food. The compound may also be a novel compound obtained by screening. For example, a calcium receptor can be reacted with a test compound, and calcium receptor activity of the compound can be detected. It can then be confirmed that the compound is able to improve fat-like richness of the low-fat food.

Hereinafter, method steps for screening for compounds which are able to activate a calcium receptor are specifically described, but are not limited these steps:

1) measure a calcium receptor activity by adding a test substance to a measurement system of calcium receptor activity;

2) compare calcium receptor activity when adding the test substance with calcium receptor activity without the test substance; and 3) select the test substance which exhibits high calcium receptor-stimulating activity.

The calcium receptor activity is measured, for example, by using a measurement system of cells that express calcium receptors. These cells can be cells that endogenously express calcium receptors, or can be recombinant cells to which exogenous calcium receptor genes are introduced. The system for measuring calcium receptor activity as described above can be used without any particular limitation as long as, when an extracellular ligand (activator) specific to a calcium receptor is added to the cells that express calcium receptors, the measurement system can detect the binding (reaction) between the activator and the calcium receptor, or may respond to the binding (reaction) between the activator and the calcium receptor to thereby transmit a detectable signal into the cells. When calcium receptor activity is detected via the reaction with the test substance, the test substance is said to be able to activate or stimulate a calcium receptor, and therefore is a substance that can improve fat-like richness of the low-fat food.

The improvement of fat-like richness of the low-fat food can be confirmed by a method such as a gustatory test by humans. Although the amino acids and peptides are not particularly limited, the peptide can have 2 to 10 amino acid residues, or a derivative thereof, and can also have 2 or 3 amino acid residues or a derivative thereof. The amino acid residue at the N-terminal side of the peptide can be γ-glutamic acid.

The origin of the calcium receptor is not particularly limited. Examples thereof include not only the human calcium receptor, but also a calcium receptor derived from, or native to, an animal such as a mouse, a rat, and a dog.

As described above, the calcium receptor activity can be confirmed by using live cells expressing a calcium receptor or its fragment, cell membranes expressing a calcium receptor or its fragment, an in vitro system containing a calcium receptor or its fragment, or the like.

An example using live cells is described below. However, confirmation of the calcium receptor activity is not limited to the method used in this example.

A calcium receptor can be expressed in cultured cells such as *Xenopus laevis* oocytes, hamster ovarian cells, or human fetal kidney cells. The calcium receptor can be expressed by cloning a calcium receptor gene in a plasmid that can contains a foreign gene, and introducing the plasmid or cRNA into the cells. To detect the reaction, an electrophysiological technique and a fluorescent indicator that indicates an increase in intracellular calcium level can be used.

Expression of the calcium receptor is first confirmed based on the response to calcium or a known activator. Oocytes having intracellular current with calcium at a concentration of about 5 mM, or cultured cells showing fluorescence of a fluorescent indicator reagent with calcium at a concentration of about 5 mM, can be used. The calcium concentration dependency is determined by changing the calcium concentration. Then, a test substance such as a peptide is prepared to a concentration of about 1 μM to 1 mM, and added to the oocytes or the cultured cells, and the calcium receptor activity of the peptide is determined.

Examples of the compound to be used in the present invention include various amino acids, peptides, or derivatives thereof, or various low molecular weight compounds that are able to activate a calcium receptor. Hereinafter, the terms "amino acid" or "peptide" can mean an amino acid and an amino acid derivative, a peptide and a peptide derivative, respectively. The amino acid or the peptide can improve the fat-like richness of a low-fat food when the amino acid or the peptide is added to the low-fat food. Examples of such an amino acid or a peptide include γ-Glu-X-Gly (X can be an amino acid or an amino acid derivative), γ-Glu-Val-Y (Y can be an amino acid or an amino acid derivative), γ-Glu-Ala, γ-Glu-Gly, γ-Glu-Cys, γ-Glu-Met, γ-Glu-Thr, γ-Glu-Val, γ-Glu-Orn, Asp-Gly, Cys-Gly, Cys-Met, Glu-Cys, Gly-Cys, Leu-Asp, D-Cys, γ-Glu-Met(O), γ-Glu-γ-Glu-Val, γ-Glu-Val-NH$_2$, γ-Glu-Val-ol, γ-Glu-Ser, γ-Glu-Tau, γ-Glu-Cys(S-Me)(O), γ-Glu-Leu, γ-Glu-Ile, γ-Glu-t-Leu, and γ-Glu-Cys (S-Me). One of these peptides or the like can be used, or two or more of these can be used in combination.

Furthermore, the peptide may be a peptide derivative having the structure of γ-Glu-X—OCH(Z)CO$_2$H, wherein X can be an amino acid or an amino acid derivative, and Z can be H (a hydrogen atom) or CH$_3$ (a methyl group)). The peptide can be γ-Glu-Val-Y in which Y can be GlyA or LacA. Specific examples thereof include γ-Glu-Val-GlyA, γ-Glu-tLeu-GlyA, γ-Glu-Abu-GlyA, γ-Glu-Val-LacA, γ-Glu-tLeu-LacA, and γ-Glu-Abu-LacA. It should be noted that GlyA can be glycolic acid and LacA can be lactic acid. Lactic acid can be either S-lactic acid or R-lactic acid. Structural formulae of those compounds are shown below.

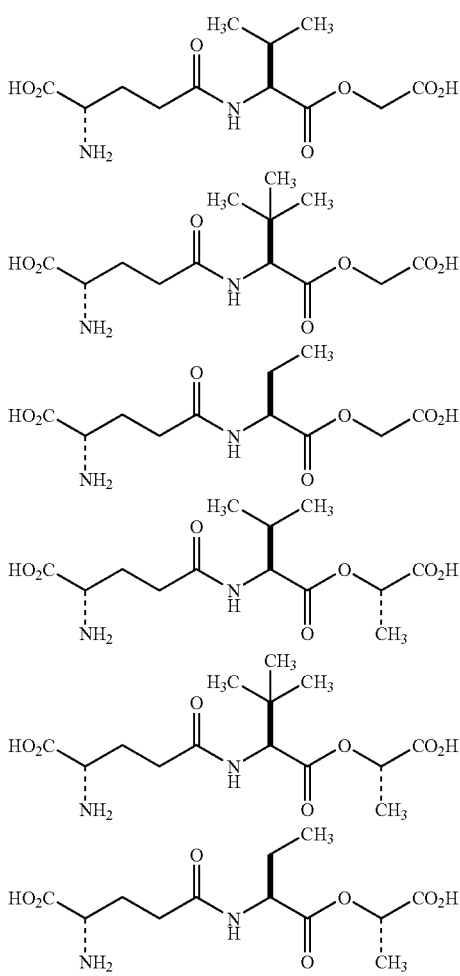

Examples of the amino acid include a neutral amino acid such as Gly, Ala, Val, Leu, Ile, Ser, Thr, Cys, Met, Asn, Gln, Pro, Hyp, and t-Leu, an acidic amino acid such as Asp and Glu; a basic amino acid such as Lys, Arg, and His; an aromatic amino acid such as Phe, Tyr, and Trp; homoserine, citrulline, ornithine, α-aminobutyric acid, norvaline, norleucine, and taurine. The amino acid may also be a non-naturally occurring (non-protein constituent) amino acid such as tert-leucine, cycloleucine, α-aminoisobutyric acid, and L-penicillamine. It should be noted that X in the peptide γ-Glu-X-Gly can be either an amino acid or a derivative thereof as described above, and can be an amino acid or a derivative thereof, other than Cys.

Herein, abbreviations for amino acid residues are as follows.

(1) Gly: Glycine
(2) Ala: Alanine
(3) Val: Valine
(4) Leu: Leucine
(5) Ile: Isoleucine
(6) Met: Methionine
(7) Phe: Phenylalanine
(8) Tyr: Tyrosine
(9) Trp: Tryptophan
(10) His: Histidine
(11) Lys: Lysine
(12) Arg: Arginine
(13) Ser: Serine
(14) Thr: Threonine
(15) Asp: Aspartic acid
(16) Glu: Glutamic acid
(17) Asn: Asparagine
(18) Gln: Glutamine
(19) Cys: Cysteine
(20) Pro: Proline
(21) Orn: Ornithine
(22) Sar: Sarcosine
(23) Cit: Citrulline
(24) N-Val: Norvaline
(25) N-Leu: Norleucine
(26) Abu: α-Aminobutyric acid
(27) Tau: Taurine
(28) Hyp: Hydroxyproline
(29) t-Leu: tert-Leucine
(30) Cle: Cycloleucine
(31) Aib: α-Aminoisobutyric acid (2-methylalanine)
(32) Pen: L-Penicillamine Examples of amino acid derivatives include various derivatives of above-mentioned amino acids such as an unusual amino acid, a non-natural amino acid, an amino alcohol, and a substituted amino acid with a side chain such as the terminal carbonyl group, the terminal amino group, and the thiol group of cysteine, that can contain various substituents. Examples of the substituents include an alkyl group, an acyl group, a hydroxy group, an amino group, an alkylamino group, a nitro group, a sulfonyl group, and various protection groups. Examples of the substituted amino acid include: Arg(NO$_2$): N-γ-nitroarginine; Cys(SNO): S-nitrocysteine; Cys(S-Me): S-methylcysteine; Cys(S-allyl): S-allylcysteine; Val-NH$_2$: valinamide; and Val-ol: valinol (2-amino-3-methyl-1-butanol).

It should be noted that γ-Glu-Cys(SNO)-Gly can have the following structural formula, and the "(O)" in the above formulae γ-Glu-Met(O) and γ-Glu-Cys(S-Me)(O) can indicate a sulfoxide structure. The "(γ)" in the γ-Glu can indicate that glutamic acid binds to another amino acid via the carboxy group at the γ-position in glutamic acid.

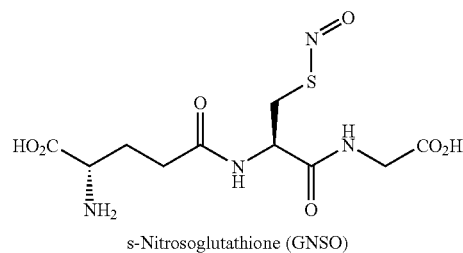 [SMILES: N[C@@H](CCC(=O)N[C@@H](CSN=O)C(=O)NCC(=O)O)C(=O)O]

s-Nitrosoglutathione (GNSO)

γ-Glu-X-Gly (X can be an amino acid or an amino acid derivative), γ-Glu-Val-Y (Y can be an amino acid or an amino acid derivative), γ-Glu-Ala, γ-Glu-Gly, γ-Glu-Cys, γ-Glu-Met, γ-Glu-Thr, γ-Glu-Val, γ-Glu-Orn, Asp-Gly, Cys-Gly, Cys-Met, Glu-Cys, Gly-Cys, Leu-Asp, D-Cys, γ-Glu-Met (O), γ-Glu-γ-Glu-Val, γ-Glu-Val-NH$_2$, γ-Glu-Val-ol, γ-Glu-Ser, γ-Glu-Tau, γ-Glu-Cys(S-Me)(O), γ-Glu-Leu, γ-Glu-Ile, γ-Glu-t-Leu, and γ-Glu-Cys(S-Me) each improve the fat-like richness of the low-fat food.

Therefore, γ-Glu-X-Gly (X can be an amino acid or an amino acid derivative), γ-Glu-Val-Y (Y can be an amino acid or an amino acid derivative), γ-Glu-Ala, γ-Glu-Gly, γ-Glu-Cys, γ-Glu-Met, γ-Glu-Thr, γ-Glu-Val, γ-Glu-Orn, Asp-Gly, Cys-Gly, Cys-Met, Glu-Cys, Gly-Cys, Leu-Asp, D-Cys, γ-Glu-Met(O), γ-Glu-γ-Glu-Val, γ-Glu-Val-NH$_2$, γ-Glu-Valol, γ-Glu-Ser, γ-Glu-Tau, γ-Glu-Cys(S-Me)(O), γ-Glu-Leu, γ-Glu-Ile, γ-Glu-t-Leu, and γ-Glu-Cys(S-Me) can be used as a taste-improving agent which is added to a low-fat food and imparts fat-like richness to the taste of the low-fat food.

The compound or agent can be used alone or can be used as a random mixture of two or more kinds of compounds. Such mixtures can include γ-Glu-X-Gly (X can be Cys(SNO), Cys (S-allyl), Gly, Cys(S-Me), Abu, t-Leu, Cle, Aib, Pen, or Ser); or γ-Glu-Val-Y (Y can be Gly, Val, Glu, Lys, Phe, Ser, Pro, Arg, Asp, Met, Thr, His, Orn, Asn, Cys, Gln, GlyA, or LacA).

When the compound is commercially available, a commercially available product can be used. When the compound is a peptide, the peptide can be obtained by appropriately using a known technique such as chemical synthesis, or by synthesizing the peptide using an enzymatic reaction. Since the number of amino acid residues contained in the peptide is usually small, such as 2 or 3 residues, chemical synthesis can be convenient. When chemically synthesizing the peptide, the oligopeptide can be synthesized or semi-synthesized by using a peptide synthesizer. An example of the method of chemical synthesis of the peptide includes using a peptide solid phase synthetic method. The peptide synthesized as described above can be purified by usual means such as ion exchange chromatography, reversed phase high performance liquid chromatography, or affinity chromatography. The solid phase synthetic method and the subsequent peptide purification are well known in this technical field.

The peptide can also be produced by an enzymatic reaction. For example, the method described in WO 2004/011653 can be used. That is, the peptide can also be produced by reacting one amino acid or dipeptide having an esterified or amidated carboxyl terminus with an amino acid having a free amino group (for example, an amino acid with a protected carboxyl group) in the presence of a peptide-producing enzyme; and purifying the produced dipeptide or tripeptide. The peptide-producing enzyme can be a part of a culture of a microorganism having the ability to produce the peptide, microbial cells separated from the culture, or a processed product of cells of the microorganism, or a peptide-producing enzyme derived from the microorganism.

It should be noted that the above-described methods are not the only means for obtaining the peptide. The peptide can also be present in, for example, a plant such as a vegetable or a fruit, a microorganism such as yeast, and a yeast extract. When the peptide is present in natural products, the peptide can be extracted from these natural products before use.

The peptide does not need to be isolated before use, and a fraction containing the peptide in a large amount can also be used.

Examples of the low-molecular-weight compound include cinacalcet
((R)—N-(3-(3-(trifluoromethyl)phenyl)propyl)-1-(1-naphthyl)ethylamine) and analogous compounds thereof. Examples of an analogous compound of cinacalcet include the compound represented by the following chemical formula (1)
((R)—N-[(4-ethoxy-3-methylphenyl)methyl]-1-(1-naphthyl)ethylamine)) or the compound represented by the following chemical formula (2)
((R)—N-(3-phenylprop-2-enyl)-1-(3-methoxyphenyl)ethylamine). These compounds may be synthesized by a known method, such as described in U.S. Pat. No. 6,211,244, for example.
Furthermore, commercially available products may also be used.

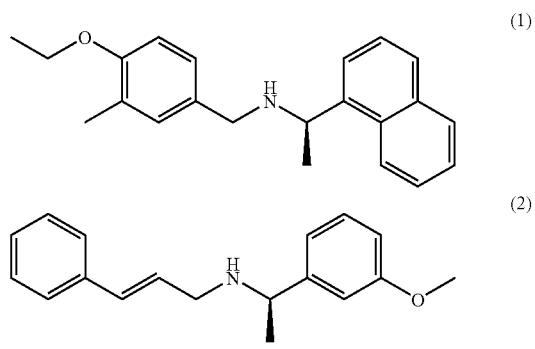

The compound can also be in the form of a salt. When the peptide and the amino acid are in the form of a salt, the salt can be a pharmacologically acceptable salt. Examples of a salt with an acidic group such as a carboxyl group in the formula include an ammonium salt; a salt with an alkali metal such as sodium and potassium; a salt with an alkaline earth metal such as calcium and magnesium, an aluminum salt, a zinc salt; a salt with an organic amine such as triethylamine, ethanolamine, morpholine, pyrrolidine, piperidine, piperazine, and dicyclohexylamine; and a salt with a basic amino acid such as arginine and lysine. Examples of a salt with a basic group include a salt with an inorganic acid such as hydrochloric acid, sulfuric acid, phosphoric acid, nitric acid, and hydrobromic acid; a salt with an organic carboxylic acid such as acetic acid, citric acid, benzoic acid, maleic acid, fumaric acid, tartaric acid, succinic acid, tannic acid, butyric acid, hibenzoic acid, pamoic acid, enanthoic acid, decanoic acid, teoclic acid, salicylic acid, lactic acid, oxalic acid, mandelic acid, and malic acid; and a salt with an organic sulfonic acid such as methanesulfonic acid, benzenesulfonic acid, and p-toluenesulfonic acid.

<2> Agent for improving the taste of low-fat foods The compound, preferably the peptide and the amino acid, can be used as a taste-improving agent for a low-fat food, which is added to the low-fat food to improve the fat-like richness of the low-fat food. The compound can be a mixture of two or more different compounds, or can be alone. The compound can be incorporated into the low-fat food, resulting in a low-fat food having improved fat-like richness.

The taste-improving agent for a low-fat food can be formulated with only one kind, or with two or more kinds of the above-described compounds. In addition, for example, the taste-improving agent can also optionally contain other compounds, various additives, and the like, as long as the taste of the low-fat food is improved.

The amount of the taste-improving agent to be added to the low-fat food is not particularly limited as long as the amount can be sufficient to improve the taste, in particular, the fat-like richness, of the low-fat food. Specifically, the amount of the added agent is 1 ppb to 99.9% by weight, in another example, 10 ppb to 10% by weight, and in another example 1 ppm to 1% by weight in the low-fat food.

The low-fat food can contain the compound. The compound may be formulated with only one kind of the above-described compounds, or a composition of a mixture of two or more kinds. The components of the low-fat food are not particularly different from that of a conventional low-fat food, except that the low-fat food contains the above-mentioned compound(s). Also for the production method, the low-fat food may be produced in the same manner as in a general low-fat food except for the addition of the above-mentioned compound.

EXAMPLES

Hereinafter, the present invention is more specifically described with reference to the following non-limiting examples.

Reference Example 1

Preparation of Calcium Receptor Gene (cRNA)

The gene of the calcium receptor gene was prepared as follows. On the basis of the DNA sequence registered at NCBI (calcium receptor: NM_000388), synthetic oligo DNAs (forward primer (SEQ ID NO: 1) and reverse primer (SEQ ID NO: 2)) were synthesized for use in PCR.

Human kidney cDNA (manufactured by Clontech) was used as a source, and PCR was performed by using the primers and Pfu ultra DNA Polymerase (manufactured by Stratagene) under the following conditions. After a reaction at 94° C. for 3 minutes, a cycle of reactions at 94° C. for 30 seconds, 55° C. for 30 seconds, and 72° C. for 2 minutes was repeated 35 times, and then a reaction was performed at 72° C. for 7 minutes. Whether amplification was attained by PCR was detected by performing agarose electrophoresis, staining with a DNA staining reagent, and subsequent ultraviolet irradiation. The chain lengths of the PCR products were confirmed by comparison with DNA markers of known sizes which were simultaneously subjected to the electrophoresis. The plasmid vector pBR322 was digested with the restriction enzyme EcoRV (manufactured by Takara). The gene fragment amplified by PCR was ligated to the cleavage site of the plasmid by using Ligation Kit (manufactured by Promega). The *Escherichia coli* DH5α strain was transformed with the ligation reaction solution, and a transformant harboring the plasmid in which the PCR amplification product was cloned was selected. The PCR amplification product was confirmed by DNA sequence analysis. By using the recombinant plasmid as a template, cRNA of the calcium receptor gene was prepared using a cRNA preparation kit (manufactured by Ambion).

Reference Example 2

Preparation of Various Samples

As L-amino acid samples, 23 kinds of special grade amino acids including alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine, ornithine, and taurine (all from Ajinomoto Co., Inc.), and hydroxyproline (Nacarai Tesque, Inc.), were used. As D-Cys and D-Trp (Nacarai Tesque, Inc.) and calcium chloride, those of special grade were used.

Furthermore, as peptide samples, γ-Glu-Cys-Gly (Sigma Aldrich Japan K.K.), γ-Glu-Cys(SNO)-Gly (Dojindo Laboratories), γ-Glu-Ala (Bachem Feinchemikalien AG), γ-Glu-Gly (Bachem Feinchemikalien AG), γ-Glu-Cys (Sigma Aldrich Japan K.K.), γ-Glu-Met (Bachem Feinchemikalien AG), γ-Glu-Abu-Gly (Abu: α-aminobutyric acid, Bachem Feinchemikalien AG), γ-Glu-Thr (Kokusan Chemical Co., Ltd.), γ-Glu-Val (Kokusan Chemical Co., Ltd.), γ-Glu-Leu (custom synthesis product), γ-Glu-Ile (custom synthesis product), γ-Glu-Orn (Kokusan Chemical Co., Ltd.), Asp-Gly (custom synthesis product), Cys-Gly (custom synthesis product), Cys-Met (custom synthesis product), Glu-Cys (custom synthesis product), Gly-Cys (custom synthesis product), Leu-Asp (custom synthesis product), γ-Glu-Val-Val (custom synthesis product), γ-Glu-Val-Glu (custom synthesis product), γ-Glu-Val-Lys (custom synthesis product), γ-Glu-γ-Glu-Val (custom synthesis product), γ-Glu-Gly-Gly (custom synthesis product), γ-Glu-Val-Phe (custom synthesis product), γ-Glu-Val-Ser (custom synthesis product), γ-Glu-Val-Pro (custom synthesis product), γ-Glu-Val-Arg (custom synthesis product), γ-Glu-Val-Asp (custom synthesis product), γ-Glu-Val-Met (custom synthesis product), γ-Glu-Val-Thr (custom synthesis product), γ-Glu-Val-His (custom synthesis product), γ-Glu-Val-Asn (custom synthesis product), γ-Glu-Val-Gln (custom synthesis product), γ-Glu-Val-Cys (custom synthesis product), γ-Glu-Val-Orn (custom synthesis product), and γ-Glu-Ser-Gly (custom synthesis product) were used. Glutamine and cysteine were prepared upon use, and the other samples were stored at −20° C. after preparation. As the peptides, those each having a purity of 90% or higher were used. Purity of 80% or higher was used only for γ-Glu-Cys.

When a solution obtained by dissolving each sample showed an acidic or alkaline pH, the solution was adjusted to an approximately neutral pH by using NaOH or HCl. The solution used for dissolution of amino acids and peptides, preparation of *Xenopus laevis* oocytes, and culture of the oocytes had the following composition: 96 mM NaCl, 2 mM KCl, 1 mM $MgCl_2$, 1.8 mM $CaCl_2$, 5 mM Hepes, and pH 7.2.

Reference Example 3

Synthesis of γ-Glu-Val-Gly

Boc-Val-OH (8.69 g, 40.0 mmol) and Gly-OBzl•HCl (8.07 g, 40.0 mmol) were dissolved in methylene chloride (100 ml) and the solution was kept at 0° C. Triethylamine (6.13 ml, 44.0 mmol), HOBt (1-hydroxybenzotriazole, 6.74 g, 44.0 mmol), and WSC•HCl (1-ethyl-3-(3-dimethylaminopropyl) carbodiimide hydrochloride, 8.44 g, 44.0 mmol) were added to the solution, and the mixture was stirred overnight at room temperature. The reaction solution was concentrated under reduced pressure, and the residue was dissolved in ethyl acetate (200 ml). The solution was washed with water (50 ml), 5% citric acid aqueous solution (50 ml× twice), saturated brine (50 ml), 5% sodium bicarbonate aqueous solution (50 ml× twice), and saturated brine (50 ml). The organic layer was dried over anhydrous magnesium sulfate, magnesium sulfate was removed by filtration, and the filtrate was concentrated under reduced pressure. The residue was recrystallized from ethyl acetate/n-hexane to obtain Boc-Val-Gly-OBzl (13.2 g, 36.2 mmol) as a white crystal.

Boc-Val-Gly-OBzl (5.47 g, 15.0 mmol) was added to a 4 N HCl/dioxane solution (40 ml), and the mixture was stirred at room temperature for 50 minutes. Dioxane was removed by concentration under reduced pressure, n-hexane (30 ml) was added to the residue, and the mixture was concentrated under reduced pressure. The procedure was repeated 3 times to quantitatively obtain H-Val-Gly-OBzl•HCl H-Val-Gly-OBzl•HCl and Z-Glu-OBzl (5.57 g, 15.0 mmol) described above were dissolved in methylene chloride (50 ml), and the solution was kept at 0° C. Triethylamine (2.30 ml, 16.5 mmol), HOBt (1-hydroxybenzotriazole, 2.53 g, 16.5 mmol), and WSC•HCl (1-ethyl-3-(3-dimethylaminopropyl) carbodiimide hydrochloride, 3.16 g, 16.5 mmol) were added to the solution, and the mixture was stirred at room temperature overnight for 2 days. The reaction solution was concentrated under reduced pressure, and the residue was dissolved in heated ethyl acetate (1,500 ml). The solution was washed with water (200 ml), 5% citric acid aqueous solution (200 ml× twice), saturated brine (150 ml), 5% sodium bicarbonate aqueous solution (200 ml× twice), and saturated brine again (150 ml). The organic layer was dried over anhydrous magnesium sulfate, magnesium sulfate was removed by filtration, and the filtrate was concentrated under reduced pressure. The precipitated crystal was collected by filtration and dried under reduced pressure to obtain Z-Glu(Val-Gly-OBzl)-OBzl (6.51 g, 10.5 mmol) as a white crystal.

Z-Glu(Val-Gly-OBzl)-OBzl described above (6.20 g, 10.03 mmol) was suspended in ethanol (200 ml), 10% palladium/carbon (1.50 g) was added to the suspension, and a reduction reaction was performed under a hydrogen atmosphere at 55° C. for 5 hours. During the reaction, 100 ml in a total volume of water was gradually added. The catalyst was removed by filtration using a Kiriyama funnel, and the filtrate was concentrated under reduced pressure to a half volume. The reaction solution was further filtered through a membrane filter, and the filtrate was concentrated under reduced pressure. After the residue was dissolved in a small volume of water, ethanol was added to precipitate a crystal, and the crystal was collected by filtration and dried under reduced pressure to obtain γ-Glu-Val-Gly as a white powder (2.85 g, 9.40 mmol).

ESI-MS: $(M+H)^+=304.1$.
$^1$H-NMR (400 MHz, $D_2O$) δ (ppm): 0.87 (3H, d, J=6.8 Hz), 0.88 (3H, d, J=6.8 Hz), 1.99-2.09 (3H, m), 2.38-2.51 (2H, m) 3.72 (1H, t, J=6.35 Hz), 3.86 (1H, d, J=17.8 Hz), 3.80 (1H, d, J=17.8 Hz), 4.07 (1H, d, J=6.8 Hz).

Reference Example 4

Synthesis of γ-Glu-Cys(S-Me)-Gly [Cys(S-Me): S-methylcysteine]

Reduced glutathione (15.0 g, 48.8 mmol) was added to water (45 ml), and sodium hydroxide (4.52 g, 2.2 equivalents, 107 mmol) was added portionwise to the mixture under bubbling with nitrogen. Methyl iodide (4.56 ml, 1.5 equivalents, 73 mmol) was added to the mixture, and the solution was sealed and stirred at room temperature for 2 hours. The reaction solution was adjusted to pH 2 to 3 with concentrated hydrochloric acid, supplemented with ethanol (150 ml), and stored overnight in a refrigerator. Since an oily product separated, the supernatant was removed. When the remaining oily product was dissolved in water and gradually supplemented with ethanol, a partially crystallized oily product precipitated. Therefore, the supernatant was removed again. The residue was dissolved in water (300 ml), adsorbed to a column filled with an ion exchange resin (Dowex 1-acetate, 400 ml), washed with water, and then eluted with a 1 N acetic acid aqueous solution. The eluate was concentrated under reduced pressure, and re-precipitated from water/ethanol to obtain γ-Glu-Cys(S-Me)-Gly as a white powder (5.08 g, 15.8 mmol).

FAB-MS: $(M+H)^+=322$.
$^1$H-NMR (400 MHz, $D_2O$) δ (ppm): 2.14 (3H, s), 2.15-2.22 (2H, m), 2.50-2.58 (2H, m), 2.86 (1H, dd, J=9.0 Hz, J=14.0 Hz), 3.03 (1H, dd, J=5.0 Hz, J=14.0 Hz), 3.84 (1H, t, J=6.5 Hz), 3.99 (2H, s), 4.59 (1H, dd, J=5.0 Hz, J=9.0 Hz)

Reference Example 5

Synthesis of Other Peptides

γ-Glu-Met(O), γ-Glu-Val-$NH_2$, γ-Glu-Val-ol, γ-Glu-Ser, γ-Glu-Tau, γ-Glu-Cys(S-Me)(O), γ-Glu-t-Leu, γ-Glu-Cys(S-allyl)-Gly, and γ-Glu-Cys(S-Me) were synthesized in accordance with Reference Examples 3 and 4.

Reference Example 6

Evaluation of Calcium Receptor-Activating Effect

For evaluation of the calcium receptor-activating effect, a Ca ion concentration-dependent Cl ionic current measuring method using a *Xenopus laevis* oocyte expression system was used. If each activator is added to *Xenopus laevis* oocytes expressing the calcium receptor, intracellular Ca ions increase. Then, the Ca ion concentration-dependent Cl channel opens, and the intracellular current value changes as an ionic current. By measuring the change in the intracellular current value, whether the calcium receptor-activating effect is present or not can be determined.

Specifically, the abdomen of *Xenopus laevis* was opened, and an egg batch was taken out and then treated with a 1% collagenase solution at 20° C. for 2 hours to obtain individual oocytes. Into the oocytes, 50 nl of 1 μg/μl receptor cRNA or 50 nl of sterilized water per oocyte were injected by using a micro glass capillary, and the oocytes were cultured at 18° C. for 2 to 3 days. For the culture, a solution obtained by adding 2 mM pyruvic acid, 10 U/ml penicillin, and 10 μg/ml streptomycin to the solution in Reference Example 2 was used. After the culture, a test solution was added to the oocytes injected with cRNA or sterilized water. Electrophysiological measurement was performed by using an amplifier Geneclamp 500 (manufactured by Axon) and recording software AxoScope 9.0 (manufactured by Axon). The oocytes were membrane potential-clamped at −70 mV by the double electrode potential clamp method, and the intracellular current via the Ca ion concentration-dependent Cl ion was measured. The maximum value of the intracellular current was defined as the response current value.

Reference Example 7

Evaluation of Calcium Receptor-Activating Effect of Calcium

The calcium receptor-activating effect of calcium was evaluated by using the method described in Reference Example 6. That is, oocytes injected with cRNA of the calcium receptor or sterilized water were prepared, and membrane potential-clamped at −70 mV by the double electrode potential clamp method. To the potential-clamped oocytes, calcium was added (2 mM, 5 mM, 10 mM, and 20 mM), and Ca ion concentration-dependent Cl response current was measured. FIG. 1 shows the results. The results confirmed that cRNA of the calcium receptor injected into the oocytes was functionally expressed. Further, since the oocytes injected with water did not respond to even a high concentration of calcium, it was confirmed that the calcium receptor was not expressed in the oocytes themselves.

Reference Example 8

Evaluation of Calcium Receptor-Activating Effect of L-Amino Acids

Figure 2:
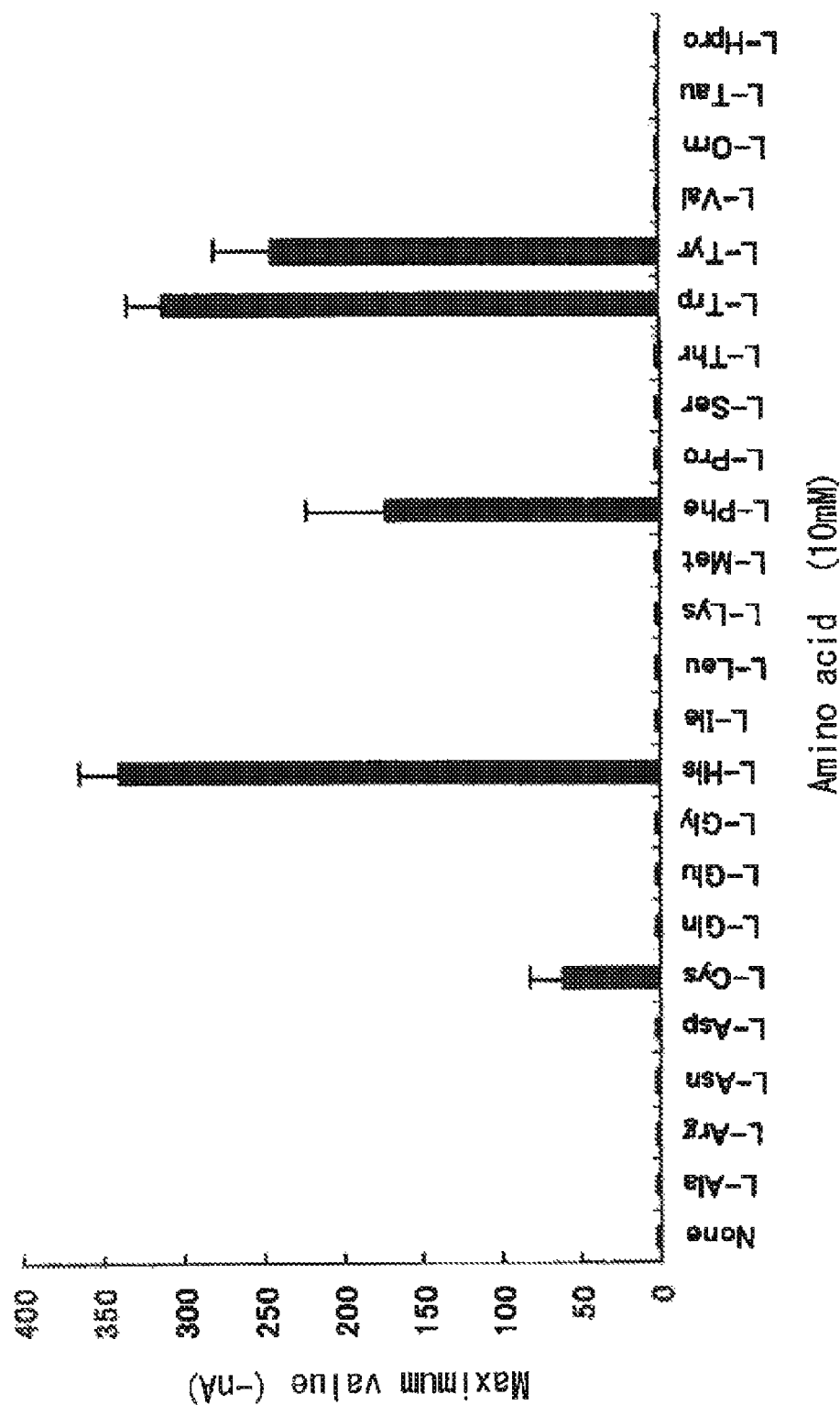
FIG. 2 shows a graph illustrating an action of an L-amino acid on a calcium receptor. The human calcium receptor cRNA was injected into Xenopus laevis oocytes by microinjection. The intracellular response current values were recorded when a 10 mM L-amino acid solution was added. The maximum value of the intracellular current was defined as a response current value. It was confirmed that no response was observed in oocytes injected with distilled water by microinjection as a control.

The calcium receptor-activating effect of L-amino acids was evaluated by using the method described in Reference Example 6. That is, oocytes injected with cRNA of the calcium receptor or sterilized water were prepared, and membrane potential-clamped at −70 mV by the double electrode potential clamp method. To the potential-clamped oocytes, alanine (10 mM), arginine (10 mM), asparagine (10 mM), aspartic acid (10 mM), cysteine (10 mM), glutamine (10 mM), glutamic acid (10 mM), glycine (10 mM), histidine (10 mM), isoleucine (10 mM), leucine (10 mM), lysine (10 mM), methionine (10 mM), phenylalanine (10 mM), proline (10 mM), serine (10 mM), threonine (10 mM), tryptophan (10 mM), tyrosine (10 mM), valine (10 mM), ornithine (10 mM), taurine (10 mM), or hydroxyproline (10 mM) was added, and Ca ion concentration-dependent Cl response current was measured. FIG. 2 shows the results. The results demonstrated that cysteine, histidine, phenylalanine, tryptophan, and tyrosine each had a definite calcium receptor-activating effect. As for the above-described amino acids, the activating effect was reported in Proc. Natl. Acad. Sci. USA, Apr. 25, 2000, 97(9): 4814-9.

Reference Example 9

Evaluation of Calcium Receptor-Activating Effect of D-Cysteine

Figure 3:
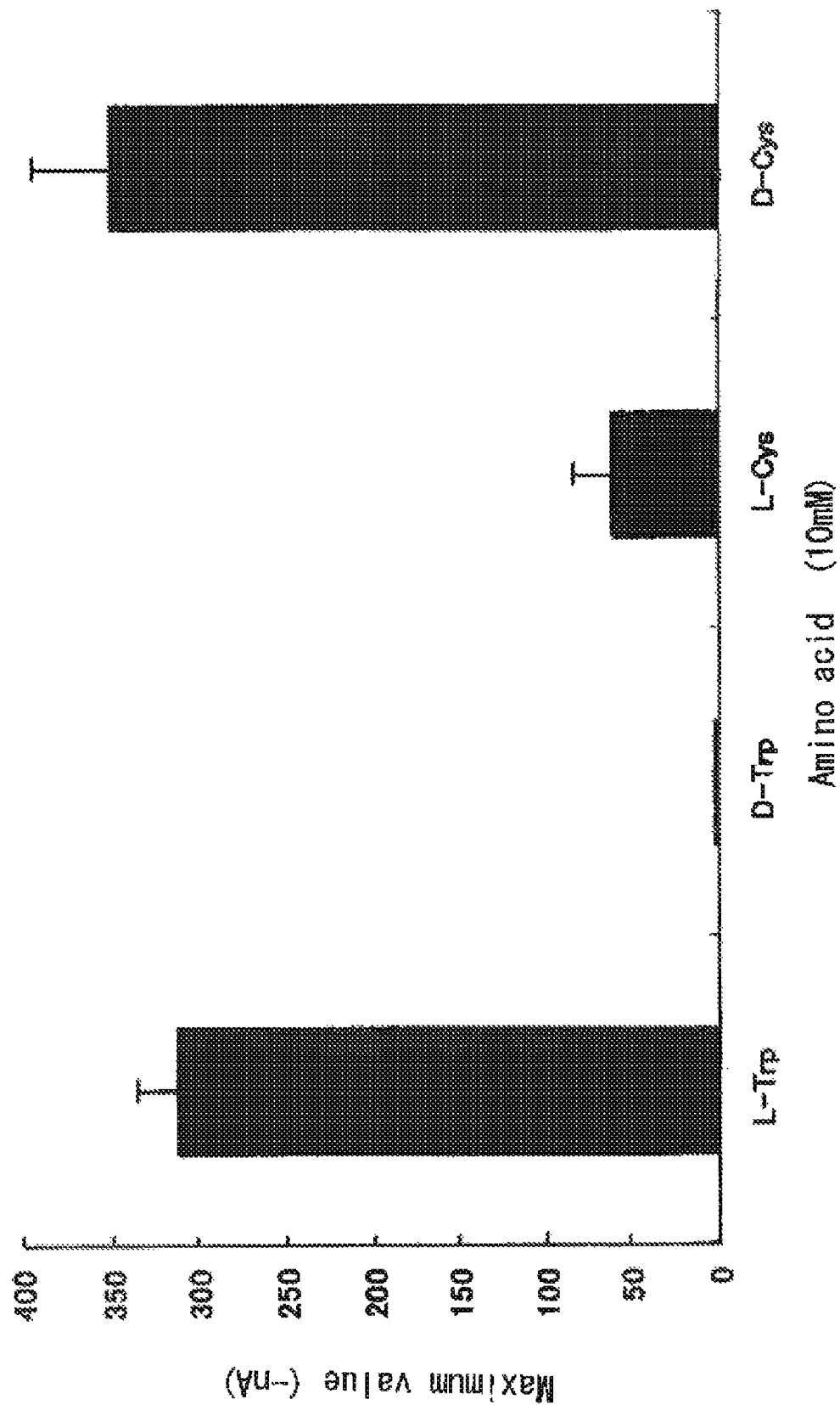
FIG. 3 shows a graph illustrating an action of a D-amino acid on a calcium receptor. The human calcium receptor cRNA was injected into Xenopus laevis oocytes by microinjection. The intracellular response current values were recorded when a 10 mM D-amino acid solution was added. The maximum value of the intracellular current was defined as a response current value. It was confirmed that no response was observed in oocytes injected with distilled water by microinjection as a control.

The calcium receptor-activating effect of D-cysteine was evaluated by using the method described in Reference Example 6. That is, oocytes injected with cRNA of the calcium receptor or sterilized water were prepared, and membrane potential-clamped at −70 mV by the double electrode potential clamp method. To the potential-clamped oocytes, D-cysteine (10 mM), L-cysteine (10 mM), D-tryptophan (10 mM), or L-tryptophan (10 mM) was added, and Ca ion concentration-dependent Cl response current was measured. FIG. 3 shows the results. The results demonstrated that D-cysteine had a definite calcium receptor-activating effect.

Reference Example 10

Evaluation of Calcium Receptor-Activating Effect of Peptides

Figure 4:
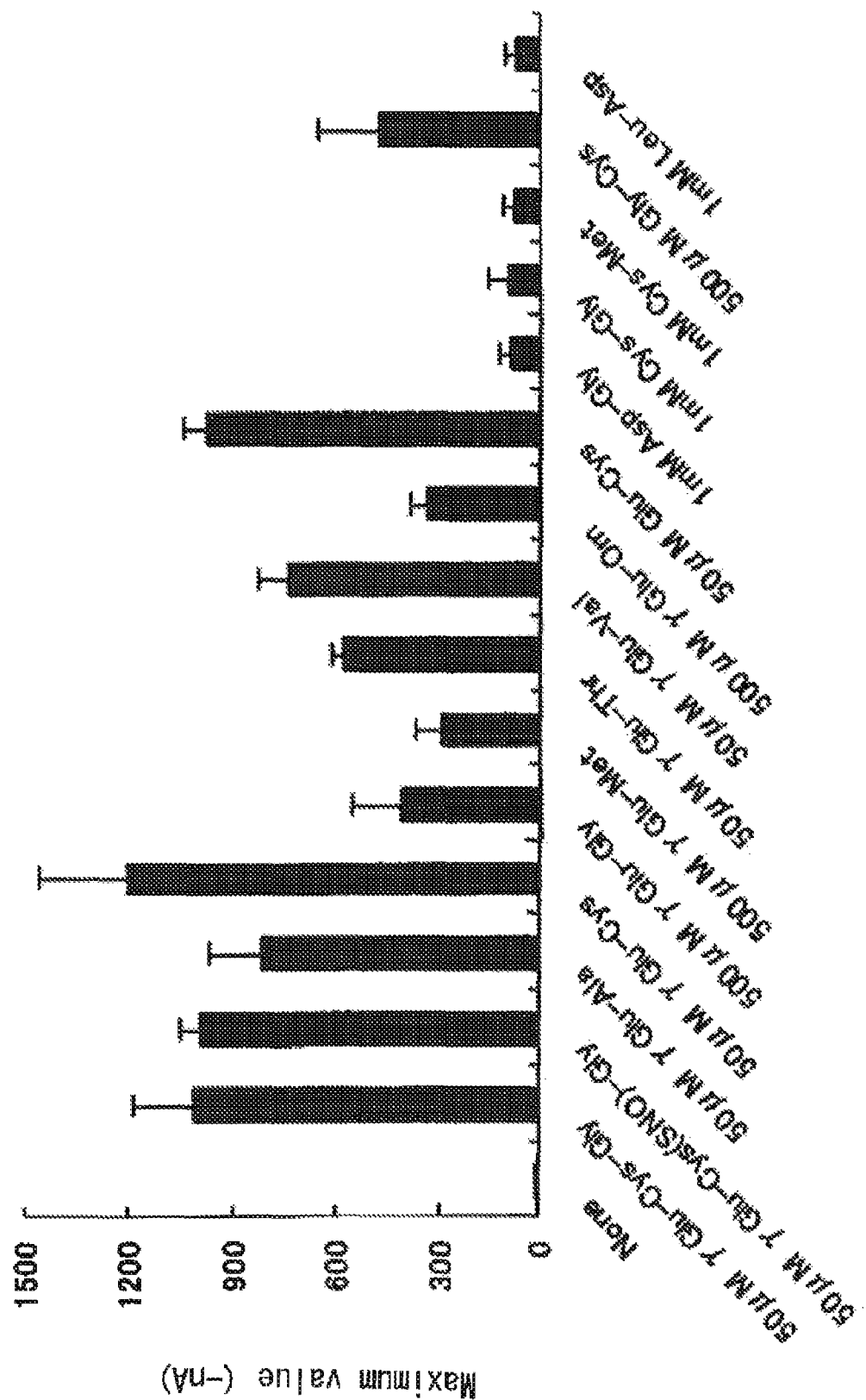
FIG. 4 shows a graph illustrating an action of a peptide on a calcium receptor. The human calcium receptor cRNA was injected into Xenopus laevis oocytes by microinjection. The intracellular response current values were recorded when a peptide solution was added at an arbitrary concentration. The maximum value of the intracellular current was defined as a response current value. It was confirmed that no response was observed in oocytes injected with distilled water by microinjection as a control.

The calcium receptor-activating effect of a peptide was evaluated by using the method described in Reference Example 6. That is, oocytes injected with cRNA of the calcium receptor or sterilized water were prepared, and membrane potential-clamped at −70 mV by the double electrode potential clamp method. To the potential-clamped oocytes, γ-Glu-Cys-Gly (50 µM), γ-Glu-Cys(SNO)-Gly (50 µM), γ-Glu-Ala (50 µM), γ-Glu-Gly (500 µM), γ-Glu-Cys (50 µM), γ-Glu-Met (500 µM), γ-Glu-Thr (50 µM), γ-Glu-Val (50 µM), γ-Glu-Orn (500 µM), Asp-Gly (1 mM), Cys-Gly (1 mM), Cys-Met (1 mM), Glu-Cys (50 µM), Gly-Cys (500 µM), or Leu-Asp (1 mM) was added, and Ca ion concentration-dependent Cl response current was measured. FIG. 4 shows the results. The results demonstrated that the above peptides had a definite calcium receptor-activating effect.

Reference Example 11

Evaluation of Calcium Receptor-Activating Effect of Peptides

The calcium receptor-activating effects of peptides were evaluated in the same manner as that of Reference Example 10. Each of the peptides shown in Table 1 was added to potential-clamped oocytes at 1,000 µM, 300 µM, 100 µM, 30 µM, 10 µM, 3 µM, 1 µM, 0.3 µM, and 0.1 µM, and Ca ion concentration-dependent Cl response current was measured. The lowest concentration at which current was detected was shown in Table 1 as the activity. The results revealed that the 32 kinds of peptides each had a calcium receptor-activating effect.

TABLE 1

| Number | Peptide | Activity |
|---|---|---|
| 1 | γ-Glu-Met(O) | 1,000 µM |
| 2 | γ-Glu-Val-Val | 1,000 µM |
| 3 | γ-Glu-Val-Glu | 1,000 µM |
| 4 | γ-Glu-Val-Lys | 1,000 µM |
| 5 | γ-Glu-Val-Arg | 1,000 µM |
| 6 | γ-Glu-Val-Asp | 1,000 µM |
| 7 | γ-Glu-Val-Met | 1,000 µM |

TABLE 1-continued

| Number | Peptide | Activity |
|---|---|---|
| 8 | γ-Glu-Val-Thr | 1,000 µM |
| 9 | γ-Glu-γ-Glu-Val | 1,000 µM |
| 10 | γ-Glu-Val-NH$_2$ | 1,000 µM |
| 11 | γ-Glu-Val-ol | 1,000 µM |
| 12 | γ-Glu-Ser | 300 µM |
| 13 | γ-Glu-Tau | 300 µM |
| 14 | γ-Glu-Cys(S-Me)(O) | 300 µM |
| 15 | γ-Glu-Val-His | 100 µM |
| 16 | γ-Glu-Val-Orn | 100 µM |
| 17 | γ-Glu-Leu | 100 µM |
| 18 | γ-Glu-Ile | 100 µM |
| 19 | γ-Glu-t-Leu | 100 µM |
| 20 | γ-Glu-Cys(S-allyl)-Gly | 100 µM |
| 21 | γ-Glu-Val-Asn | 30 µM |
| 22 | γ-Glu-Gly-Gly | 30 µM |
| 23 | γ-Glu-Val-Phe | 30 µM |
| 24 | γ-Glu-Val-Ser | 30 µM |
| 25 | γ-Glu-Val-Pro | 30 µM |
| 26 | γ-Glu-Ser-Gly | 30 µM |
| 27 | γ-Glu-Cys(S-Me) | 30 µM |
| 28 | γ-Glu-Val-Cys | 10 µM |
| 29 | γ-Glu-Val-Gln | 10 µM |
| 30 | γ-Glu-Abu-Gly | 3 µM |
| 31 | γ-Glu-Cys(S-Me)-Gly | 3 µM |
| 32 | γ-Glu-Val-Gly | 0.1 µM |

Reference Example 12

Kokumi-Imparting Activity of Peptide and Amino Acid

Typical examples include γ-Glu-X-Gly (X represents Cys (SNO), Cys(S-allyl), Gly, Cys(S-Me), Abu, or Ser), γ-Glu-Val-Y (Y represents Gly, Val, Glu, Lys, Phe, Ser, Pro, Arg, Asp, Met, Thr, His, Orn, Asn, Cys, or Gln), γ-Glu-Ala, γ-Glu-Gly, γ-Glu-Cys, γ-Glu-Met, γ-Glu-Thr, γ-Glu-Val, γ-Glu-Orn, Asp-Gly, Cys-Gly, Cys-Met, Glu-Cys, Gly-Cys, Leu-Asp, D-Cys, γ-Glu-Met(O), γ-Glu-γ-Glu-Val, γ-Glu-Val-NH$_2$, γ-Glu-Val-ol, γ-Glu-Ser, γ-Glu-Tau, γ-Glu-Cys(S-Me)(O), γ-Glu-Leu, γ-Glu-Ile, γ-Glu-t-Leu, and γ-Glu-Cys(S-Me), in each of which a calcium receptor-activating effect was found, and the presence or absence of the kokumi-imparting activity was examined by a sensory evaluation test.

The sensory evaluation test was performed as follows. To distilled water containing sodium glutamate (0.05 g/dl), inosine monophosphate (0.05 g/dl), and calcium chloride (1 mM), each of alliin (S-allyl-cysteine sulfoxide: control experiment of kokumi-imparting activity), γ-Glu-Cys-Gly, γ-Glu-Cys, γ-Glu-Ala, and γ-Glu-Val was mixed as a sample in an amount of 0.2 g/dl, and the presence or absence of the kokumi-imparting activity was determined. It should be noted that a sample, which became acidic after the sample had been dissolved, was adjusted with NaOH to pH 6.8 to 7.2 before use. Table 2 shows the results.

TABLE 2

Kokumi-imparting activity of calcium receptor activator

| Calcium receptor promoter | Kokumi-imparting activity |
|---|---|
| γGlu-Cys-Gly | + |
| γGlu-Cys | + |
| γGlu-Ala | + |
| γGlu-Val | + |

Reference Example 13

Kokumi-Imparting Activity of Peptide

A peptide in which a calcium receptor-activating effect was found was examined for its intensity of kokumi-imparting activity by a quantitative sensory evaluation test.

The quantitative sensory evaluation test was performed as follows. To distilled water containing sodium glutamate (0.05 g/dl), inosine monophosphate (0.05 g/dl), and sodium chloride (0.5 g/dl), each of γ-Glu-Cys-Gly (glutathione), γ-Glu-Ala, γ-Glu-Met, and γ-Glu-Val was mixed as a sample in an amount of 0.1 g/dl, and the kokumi-imparting activity intensity was measured. It should be noted that a sample, which became acidic after the sample had been dissolved, was adjusted with NaOH to pH 6.8 to 7.2 before use. It should also be noted it is known that glutathione may impart kokumi to a food, and thus, glutathione was used as a comparative control. The test was performed with n=3 based on the following sensory evaluation scores: control (0 point) and glutathione addition (3 points). Table 3 shows the results. It should be noted that the phrase "initial and middle taste" is a collective term of the initial taste plus the middle taste.

TABLE 3

| Sample | Concentration (g/dl) | Kokumi intensity Initial and middle taste | Aftertaste | Taste profile |
|---|---|---|---|---|
| Control | — | 0 | 0 | — |
| γGlu-Cys-Gly | 0.1 | 3.0 | 3.0 | Thickness, growth, and continuity are enhanced. |
| γGlu-Ala | 0.1 | 0.5 | 0.2 | The effect is weak, but thickness is slightly enhanced. |
| γGlu-Met | 0.1 | 1.5 | 0.4 | Thickness and growth are slightly enhanced. |
| γGlu-Val | 0.1 | 3.0 | 1.0 | Thickness and growth are enhanced mainly in initial and middle taste. |

Reference Example 14

Kokumi-Imparting Activity of Peptide

Peptides that are able to activate a calcium receptor were examined for kokumi-imparting activity by a quantitative sensory evaluation test.

The quantitative sensory evaluation test was performed as follows. To distilled water containing sodium glutamate (0.05 g/dl), inosine monophosphate (0.05 g/dl), and sodium chloride (0.5 g/dl), each of γ-Glu-Cys-Gly (glutathione), γ-Glu-Cys, γ-Glu-Val, and γ-Glu-Val-Gly was mixed as a sample in an amount of 0.1 g/dl, or 0.01 g/dl as required, and the intensity of kokumi-imparting activity was measured. It should be noted that a sample, which became acidic after the sample had been dissolved, was adjusted with NaOH to pH 6.8 to 7.2 before use. The test was performed with n=5 based on the following sensory evaluation scores: control (0 point) and glutathione addition (3 points). Table 4 shows the results.

TABLE 4

| Sample | Concentration (g/dl) | Kokumi intensity Initial and middle taste | Aftertaste | Taste profile |
|---|---|---|---|---|
| Control | — | 0 | 0 | — |
| γGlu-Cys-Gly | 0.1 | 3.0 | 3.0 | Thickness, growth, and continuity are enhanced. |
| γGlu-Cys | 0.1 | 2.0 | 2.0 | A slightly weaker but comparable effect is exhibited compared with γ-Glu-Cys-Gly. |
| γGlu-Val | 0.1 | 3.0 | 1.0 | Thickness and growth are enhanced mainly in initial and middle taste. |
| γGlu-Val-Gly | 0.1 | * | * | * |
| γGlu-Val-Gly | 0.01 | 3.0 | 3.0 | Thickness and continuity are mainly enhanced. The whole taste is enhanced. |

* Unmeasurable: kokumi-imparting activity is too strong to measure by sensory evaluation.

Reference Example 15

Kokumi-Imparting Activity of Peptide

Peptides that activate a calcium receptor were examined for kokumi-imparting activity by a quantitative sensory evaluation test.

The quantitative sensory evaluation test was performed as follows. To distilled water containing sodium glutamate (0.05 g/dl), inosine monophosphate (0.05 g/dl), and sodium chloride (0.5 g/dl), each of γ-Glu-Cys-Gly (glutathione), γ-Glu-Abu-Gly, and γ-Glu-Val-Gly was mixed as a sample in an amount of 0.1 g/dl or 0.01 g/dl, and the intensity of kokumi-imparting activity was measured. It should be noted that a sample, which became acidic after the sample had been dissolved, was adjusted with NaOH to pH 6.8 to 7.2 before use. The test was performed with n=12 based on the following sensory evaluation scores: control (0 point) and glutathione addition (3 points). Table 5 shows the results.

TABLE 5

| Sample | Concentration (g/dl) | Kokumi intensity | | Taste profile |
| --- | --- | --- | --- | --- |
| | | Initial and middle taste | Aftertaste | |
| Control | — | 0 | 0 | — |
| γGlu-Cys-Gly | 0.1 | 3.0 | 3.0 | Thickness, growth, and continuity are enhanced. |
| γGlu-Abu-Gly | 0.01 | 3.0 | 2.0 | Thickness and growth are enhanced mainly in initial and middle taste. |
| γGlu-Val-Gly | 0.01 | 3.0 | 3.0 | Thickness and continuity are mainly enhanced. The whole taste is enhanced. |

Example 1

Low-Fat Milk (I)

Peptides having a calcium receptor-activating effect and a kokumi-imparting activity were examined for intensity of imparting fat-like richness to low-fat milk by a quantitative sensory evaluation test.

The quantitative sensory evaluation test was performed as follows. Each of γ-Glu-Cys-Gly (glutathione), γ-Glu-Val-Gly, and γ-Glu-Abu-Gly was mixed with commercially-available low-fat milk (non-fat milk solids content: 8.6% or more, milk fat content: 1.5%) at a concentration of 0.00001 to 1 g/dl, and the intensity of imparting fat-like richness was measured.

It should be noted that each peptide was dissolved in low-fat milk, and then a sample, the pH of which was lowered, was adjusted with NaOH so that the pH might be ±0.2 with respect to the pH of the low-fat milk free of peptide.

The sensory score for fat-like richness and smoothness was defined as follows: control (free of peptide): 0 point; strong: 3 points; and very strong: 5 points. Then, the test was performed with n=12. The taste-improving activity was widely exhibited at the above-mentioned addition concentrations. Table 6 shows the results at typical concentrations. As clear from Table 6, it was confirmed that the peptide imparted fat-like richness and smoothness to low-fat milk at a lower concentration than glutathione.

TABLE 6

| Sample | Concentration (g/dl) | Fat-like richness | Smoothness | Taste profile |
|---|---|---|---|---|
| Control | — | 0 | 0 | — |
| γGlu-Cys-Gly | 0.01 | 2.5 | 3.0 | Growth exists in the whole taste. |
| γGlu-Val-Gly | 0.0001 | 2.5 | 2.3 | Taste is enhanced in middle taste and aftertaste. |
| γGlu-Val-Gly | 0.001 | 4.5 | 4.0 | Taste is enhanced in middle taste and aftertaste, and strong taste is achieved. |
| γGlu-Abu-Gly | 0.001 | 2.3 | 3.0 | Harmony and growth exist in the whole taste. |
| γGlu-Abu-Gly | 0.01 | 4.3 | 4.0 | Harmony and growth exist in the whole taste. |

Example 2

Low-Calorie Mayonnaise (Low-Calorie Salad Creamy Dressing) (I)

Peptides having a calcium receptor-activating effect and a kokumi-imparting activity were examined for intensity of imparting fat-like richness to low-calorie mayonnaise by a quantitative sensory evaluation test.

In the same manner as that in Example 1 except that commercially-available low-calorie mayonnaise (having a fat content reduced by 50% compared with a normal product) was used instead of low-fat milk, each peptide was measured for its fat-like richness-imparting intensity.

Each peptide widely exhibited a taste-improving activity at various concentrations. Table 7 shows the results at typical concentrations. As clear from Table 7, it was confirmed that the peptide of the present invention imparted fat-like richness and smoothness to the low-calorie mayonnaise at a lower concentration than glutathione.

TABLE 7

| Sample | Concentration (g/dl) | Fat-like richness | Smoothness | Taste profile |
|---|---|---|---|---|
| Control | — | 0 | 0 | — |
| γGlu-Cys-Gly | 0.01 | 3.5 | 3.0 | Fat-like richness with sweet taste is achieved. Milky flavor is enhanced. |
| γGlu-Val-Gly | 0.0001 | 3.0 | 3.0 | Taste is enhanced in middle taste and aftertaste, and lasting taste is present. |
| γGlu-Val-Gly | 0.001 | 4.8 | 4.5 | Taste is enhanced in middle taste and aftertaste, and lasting taste is present. Strong harmony is achieved. |
| γGlu-Abu-Gly | 0.001 | 3.2 | 3.0 | Fat-like richness with sweet taste is present in initial taste and middle taste. |
| γGlu-Abu-Gly | 0.01 | 4.7 | 4.3 | Fat-like richness with sweet taste is present in initial taste and middle taste. Growth exists in the whole taste. |

Example 3

Low-Fat Milk (II)

A peptide having a calcium receptor-activating effect and a kokumi-imparting activity, and cinacalcet, which is known to have a calcium receptor-activating effect, were examined for their intensities of imparting fat-like richness to low-fat milk by a quantitative sensory evaluation test.

The quantitative sensory evaluation test was performed as follows. Each of γ-Glu-Val-Gly and cinacalcet was mixed with commercially-available low-fat milk (non-fat milk solids content: 8.6% or more, milk fat content: 1.5%) at a concentration of 0.00001 to 1 g/dl, and the intensity of imparting fat-like richness was measured.

It should be noted that each sample was dissolved in low-fat milk, and then a sample, the pH of which was lowered, was adjusted with NaOH so that the pH might be ±0.2 with respect to the pH of the low-fat milk free of a sample.

The sensory score for fat-like richness and smoothness was defined as follows: control (free of sample): 0 point; strong: 3 points; and very strong: 5 points. Then, the test was performed with n=12. The taste-improving activity was widely exhibited at the above-mentioned addition concentrations. Table 8 shows the results at typical concentrations. As clear from Table 8, it was confirmed that cinacalcet imparted fat-like richness and smoothness to the low-fat milk with at a comparable concentration to γ-Glu-Val-Gly.

TABLE 8

| Sample | Concentration (g/dl) | Fat-like richness | Smoothness | Taste profile |
| --- | --- | --- | --- | --- |
| Control | — | 0 | 0 | — |
| γGlu-Val-Gly | 0.001 | 4.5 | 4.0 | Taste is enhanced in middle taste and aftertaste, and strong taste is achieved. |
| Cinacalcet | 0.0001 | 1.3 | 1.7 | Lasting is present in aftertaste. |
| Cinacalcet | 0.001 | 4.0 | 4.2 | Thickness and lasting aftertaste are present. |

Example 4

Low-Calorie Mayonnaise (Low-Calorie Salad Creamy Dressing) (II)

Peptides having a calcium receptor-activating effect and a kokumi-imparting activity, and cinacalcet, which is known to have a calcium receptor-activating effect, were examined for their intensities of imparting fat-like richness to low-calorie mayonnaise by a quantitative sensory evaluation test.

In the same manner as that in Example 2, each sample was measured for its intensity of imparting fat-like richness.

Each sample widely exhibited a taste-improving activity at various concentrations. Table 9 shows the results at typical concentrations. As clear from Table 9, it was confirmed that the cinacalcet imparted fat-like richness and smoothness to the low-calorie mayonnaise at a comparable concentration to γ-Glu-Val-Gly.

TABLE 9

| Sample | Concentration (g/dl) | Fat-like richness | Smoothness | Taste profile |
| --- | --- | --- | --- | --- |
| Control | — | 0 | 0 | — |
| γGlu-Val-Gly | 0.001 | 4.8 | 4.5 | Taste is enhanced in middle taste and aftertaste, and lasting taste is present. Harmony is strong. |
| Cinacalcet | 0.0001 | 1.8 | 2.5 | Lasting is present in aftertaste. |
| Cinacalcet | 0.001 | 4.3 | 4.8 | Thickness and lasting aftertaste are present. |

Example 5

Low-Fat Yogurt

Peptides having a calcium receptor-activating effect and a kokumi-imparting activity, and cinacalcet, which is known to have a calcium receptor-activating effect, were examined for their intensities of imparting fat-like richness to low-fat yogurt by using a quantitative sensory evaluation test.

The quantitative sensory evaluation test was performed as follows. Each of γ-Glu-Val-Gly and cinacalcet was mixed with commercially-available low-fat yogurt (non-fat milk solids content: 10.0%, milk fat content: 1.0%) at a concentration of 0.00001 to 1 g/dl, and the intensity of imparting fat-like richness was measured.

It should be noted that after each sample was dissolved in low-fat yogurt, and a sample, the pH of which was lowered, was adjusted with NaOH so that the pH might be ±0.2 with respect to the pH of the low-fat milk free of a sample.

The sensory score for fat-like richness and smoothness was defined as follows: control (free of sample): 0 point; strong: 3 points; and very strong: 5 points. Then, the test was performed with n=12. A taste-improving activity was exhibited in a wide range of the above-mentioned addition concentrations. Table 10 shows the results at typical concentrations. As clear from Table 10, it was confirmed that cinacalcet and γ-Glu-Val-Gly each imparted fat-like richness and smoothness to the low-fat yogurt at a similar concentration.

TABLE 10

| Sample | Concentration (g/dl) | Fat-like richness | Smoothness | Taste profile |
| --- | --- | --- | --- | --- |
| Control | — | 0 | 0 | — |
| γGlu-Val-Gly | 0.001 | 4.5 | 4.0 | Taste is enhanced in middle taste and aftertaste, and strong taste is achieved. |
| Cinacalcet | 0.0001 | 1.5 | 2.0 | Lasting is present in aftertaste. |
| Cinacalcet | 0.001 | 4.0 | 4.5 | Lasting is present in aftertaste. |

INDUSTRIAL APPLICABILITY

The low-fat food containing the above-described compound, preferably the amino acid or the peptide, having a calcium receptor-activating effect is excellent in taste, in particular, fat-like richness and smoothness, and hence, can be widely utilized for a dairy product, an emulsified food, and the like. The compound having a calcium receptor-activating effect may also be utilized as a taste-improving agent that is added to a low-fat food for imparting fat-like richness to a taste of the low-fat food.

While the invention has been described in detail with reference to exemplary embodiments thereof, it will be apparent to one skilled in the art that various changes can be made, and equivalents employed, without departing from the scope of the invention. Each of the aforementioned documents is incorporated by reference herein in its entirety.

What is claimed is:

1. A low-fat food comprising:
   a compound which is able to activate a calcium receptor, wherein the concentration of said compound in said food is 1 ppb to 99.9% by weight, and wherein the compound is selected from the group consisting of γ-Glu-X-Gly, and γ-Glu-Val-Y, wherein X is selected from the group consisting of Gly, Abu, t-Leu, Cle, Aib, Pen, and Ser, and Y is selected from the group consisting of Gly, Val, Glu, Lys, Phe, Ser, Pro, Arg, Asp, Met, Thr, His, Orn, Asn, Cys, GlyA, LacA, and Gln.

2. A low-fat food comprising:
   a compound which is able to activate a calcium receptor, wherein the concentration of said compound in said food is 1 ppb to 99.9% by weight, wherein the compound is selected from the group consisting of γ-Glu-Val-Gly and γ-Glu-Abu-Gly.

3. The food according to claim 1, wherein the concentration of said compound in said food is 10 ppb to 10% by weight in the food.

4. The food according to claim 1, wherein the concentration of said compound in said food is 1 ppm to 1% by weight in the food.

5. The food according to claim 2, wherein the concentration of said compound in said food is 10 ppb to 10% by weight in the food.

6. The food according to claim 2, wherein the concentration of said compound in said food is 1 ppm to 1% by weight in the food.

7. The low-fat food according to claim 1, wherein the low-fat food is selected from the group consisting of a dairy product, a food comprising animal oil and fat, a food comprising vegetable oil and fat, and an emulsified food.

* * * * *

```
                             SEQUENCE LISTING

<160> NUMBER OF SEQ ID NOS: 2

<210> SEQ ID NO 1
<211> LENGTH: 49
<212> TYPE: DNA
<213> ORGANISM: Artificial
<220> FEATURE:
<223> OTHER INFORMATION: hCASR_N primer

<400> SEQUENCE: 1
actaatacga ctcactatag ggaccatggc attttatagc tgctgctgg              49

<210> SEQ ID NO 2
<211> LENGTH: 29
<212> TYPE: DNA
<213> ORGANISM: Artificial
<220> FEATURE:
<223> OTHER INFORMATION: hCASR_C primer

<400> SEQUENCE: 2
ttatgaattc actacgtttt ctgtaacag                                     29
```